US012215760B2

(12) United States Patent
Hambarde

(10) Patent No.: US 12,215,760 B2
(45) Date of Patent: Feb. 4, 2025

(54) SYSTEMS FOR A DRIVE UNIT

(71) Applicant: DANA ITALIA S.R.L., Arco (IT)

(72) Inventor: Rajesh Hambarde, Pune (IN)

(73) Assignee: DANA ITALIA S.R.L., Arco (IT)

( * ) Notice: Subject to any disclaimer, the term of this patent is extended or adjusted under 35 U.S.C. 154(b) by 0 days.

(21) Appl. No.: 18/346,684

(22) Filed: Jul. 3, 2023

(65) Prior Publication Data

US 2025/0012341 A1 Jan. 9, 2025

(51) Int. Cl.
| | |
|---|---|
| F16H 1/14 | (2006.01) |
| B60K 17/04 | (2006.01) |
| F16H 1/12 | (2006.01) |
| F16H 1/24 | (2006.01) |
| F16H 57/021 | (2012.01) |
| F16H 57/038 | (2012.01) |
| B60K 7/00 | (2006.01) |
| F16H 57/02 | (2012.01) |

(52) U.S. Cl.
CPC ........... F16H 1/145 (2013.01); B60K 17/043 (2013.01); F16H 1/125 (2013.01); F16H 1/24 (2013.01); F16H 57/021 (2013.01); F16H 57/038 (2013.01); B60K 7/0007 (2013.01); F16H 2057/02034 (2013.01); F16H 2057/02043 (2013.01)

(58) Field of Classification Search
CPC . F16H 1/145; F16H 1/125; F16H 1/24; F16H 57/021; F16H 57/038; F16H 2057/02034; F16H 2057/02043; F16H 2048/426; F16H 2057/0213; B60K 17/043
See application file for complete search history.

(56) References Cited

U.S. PATENT DOCUMENTS

| | | | | |
|---|---|---|---|---|
| 1,506,365 A | * | 8/1924 | Domizi | F16H 48/08 475/246 |
| 1,909,792 A | * | 5/1933 | Weston | F16H 3/68 475/5 |
| 2,037,074 A | * | 4/1936 | Griswold | F16H 57/0483 384/469 |
| 2,037,961 A | * | 4/1936 | Boden | F16H 48/08 384/571 |
| 2,056,881 A | * | 10/1936 | Alden | F16H 48/08 475/230 |
| 2,609,710 A | * | 9/1952 | Osborn | F16H 48/08 29/898.07 |
| 5,501,117 A | | 3/1996 | Mensing et al. | |
| 7,210,374 B2 | | 5/2007 | Leimann | |
| 2005/0130785 A1 | * | 6/2005 | Konda | F16H 55/0886 475/230 |
| 2005/0178222 A1 | | 8/2005 | Kajino et al. | |
| 2014/0274541 A1 | | 9/2014 | Downs et al. | |

FOREIGN PATENT DOCUMENTS

| | | | | |
|---|---|---|---|---|
| CN | 103836150 B | * | 1/2017 | ............. F16C 17/02 |
| JP | 2005201381 A | | 7/2005 | |

OTHER PUBLICATIONS

Machine translation of CN 103836150 B, obtained from FIT database (Year: 2013).*

* cited by examiner

Primary Examiner — Thomas C Diaz
(74) Attorney, Agent, or Firm — McCoy Russell LLP

(57) ABSTRACT

Systems are provided for a master drive unit. In one example, a system may include a master drive unit (MDU) comprising a hypoid pinion coupled to a hypoid gear, wherein the hypoid pinion comprises an end supported by a bearing arranged in a housing projection of a housing of the MDU.

5 Claims, 10 Drawing Sheets

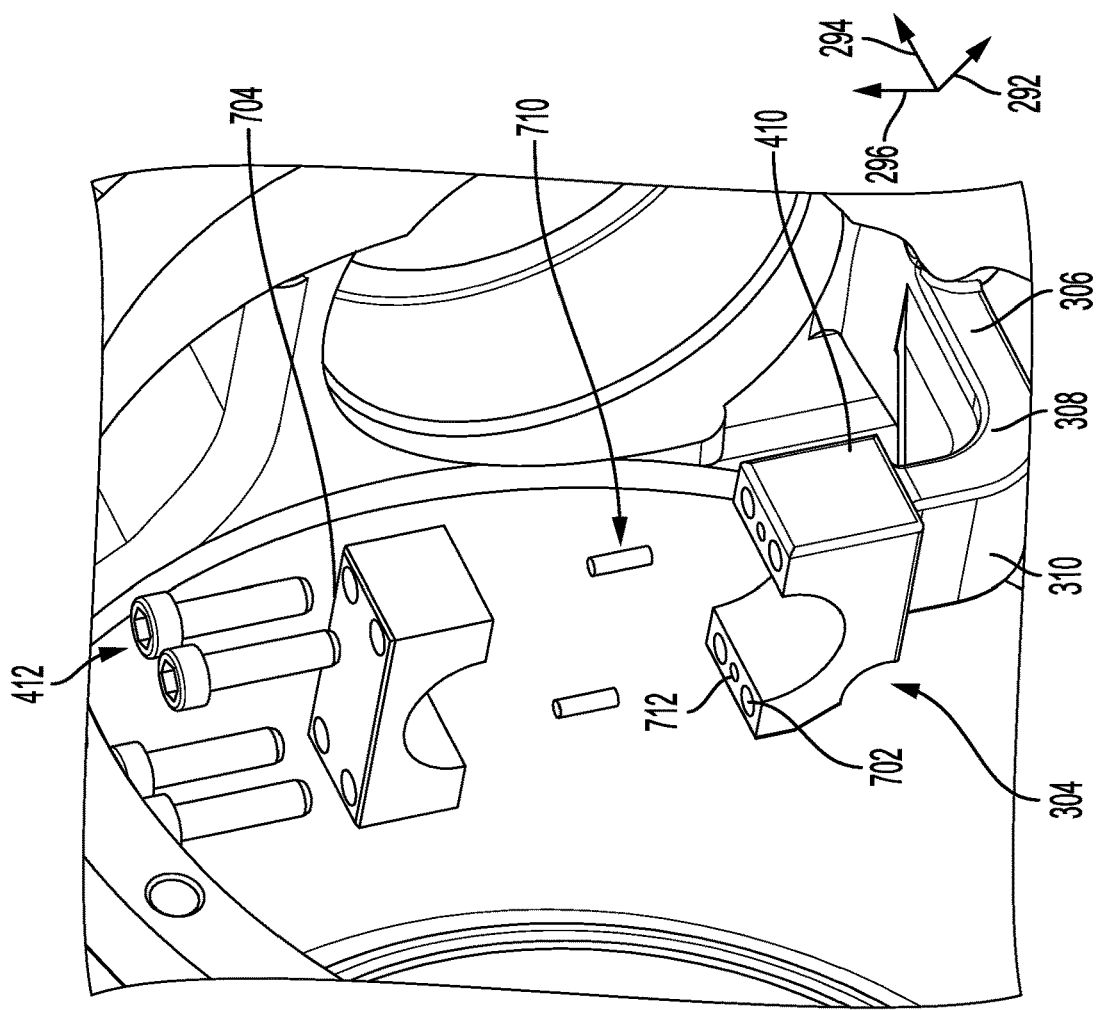
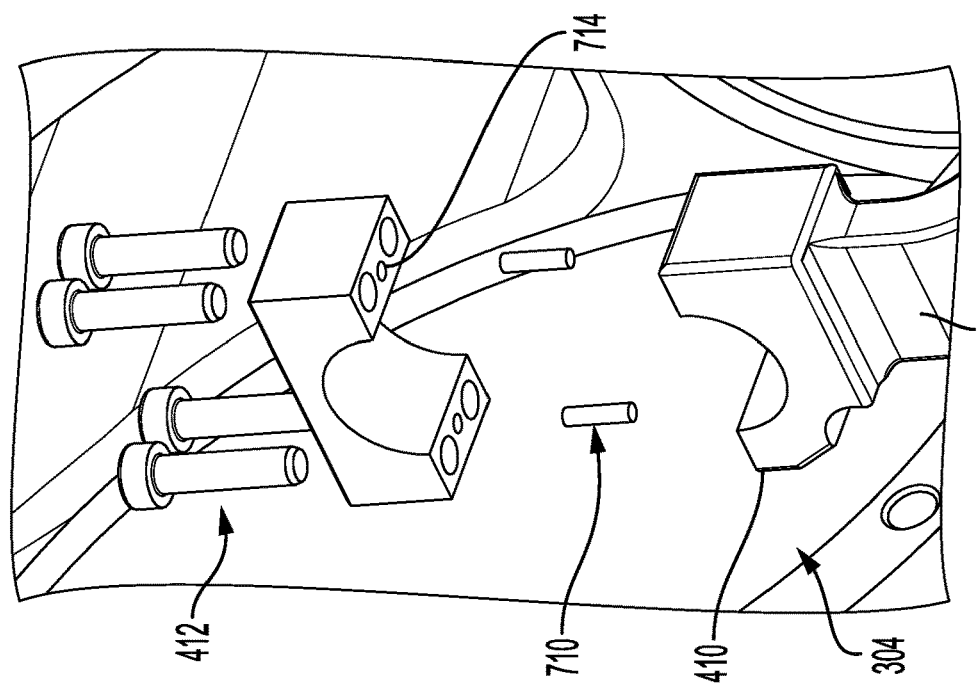
FIG. 7A
FIG. 7B

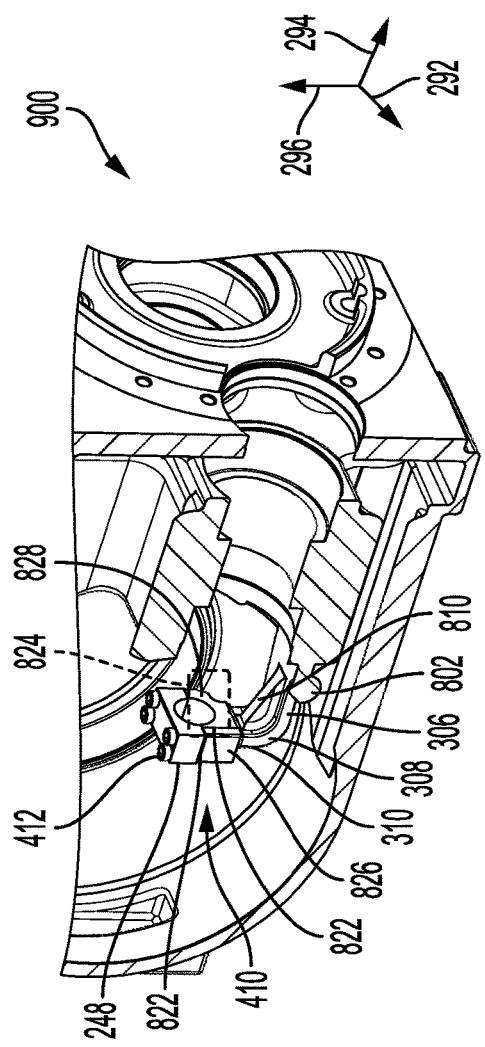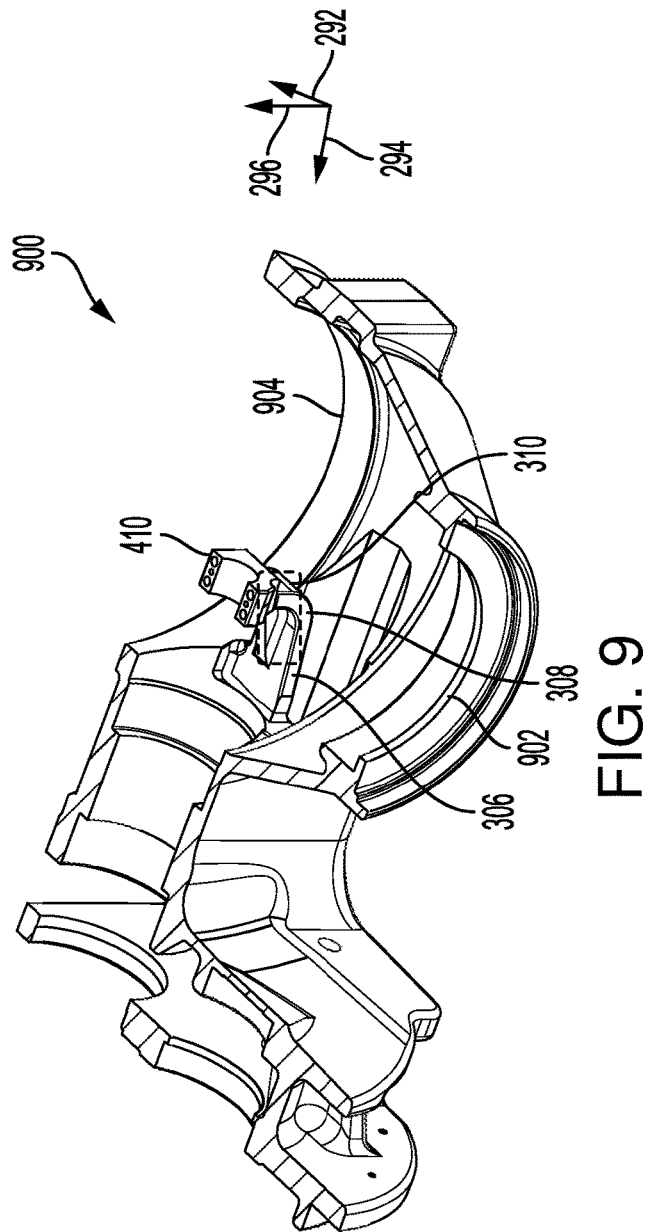
FIG. 8
FIG. 9

SYSTEMS FOR A DRIVE UNIT

TECHNICAL FIELD

The present description relates generally to a drive unit of an off-highway vehicle.

BACKGROUND AND SUMMARY

Vehicles may include a driveline with a power source, a transmission, a drive axle, and a drive unit. The master drive unit (MDU) may control power to the wheels and/or to accessory elements of the vehicle. For example, if the vehicle is an off-highway vehicle, such as a forklift, the master drive unit may control power to the wheels and the fork.

MDUs may include a vertical drive with hypoid gears as a final gear pair. A hypoid pinion may change a direction in which power is translated. The hypoid pinion may be supported by bearings proximal to pinion teeth. The hypoid pinion may be cantilevered, which may result in relatively high lateral deflections due to gear forces. These deflections may result in premature degradation of the pinion and gear teeth.

In one example, the issues described above may be at least partially solved by a system that includes a master drive unit (MDU) comprising a hypoid pinion coupled to a hypoid gear, wherein the hypoid pinion comprises an end supported by a bearing arranged in a housing projection of a housing of the MDU.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE FIGURES

The above, as well as other advantages of the present disclosure, will become readily apparent to those skilled in the art from the following detailed description when considered in light of the accompanying drawings in which:

FIGS. 7A and 7B are views of a cap and a plurality of fasteners for coupling to the housing projection, according to an embodiment of the present disclosure;

FIGS. 8 and 9 are views of a notch machined into the support for providing additional clearance for a gear, according to an embodiment of the present disclosure;

DETAILED DESCRIPTION

Figure 1:
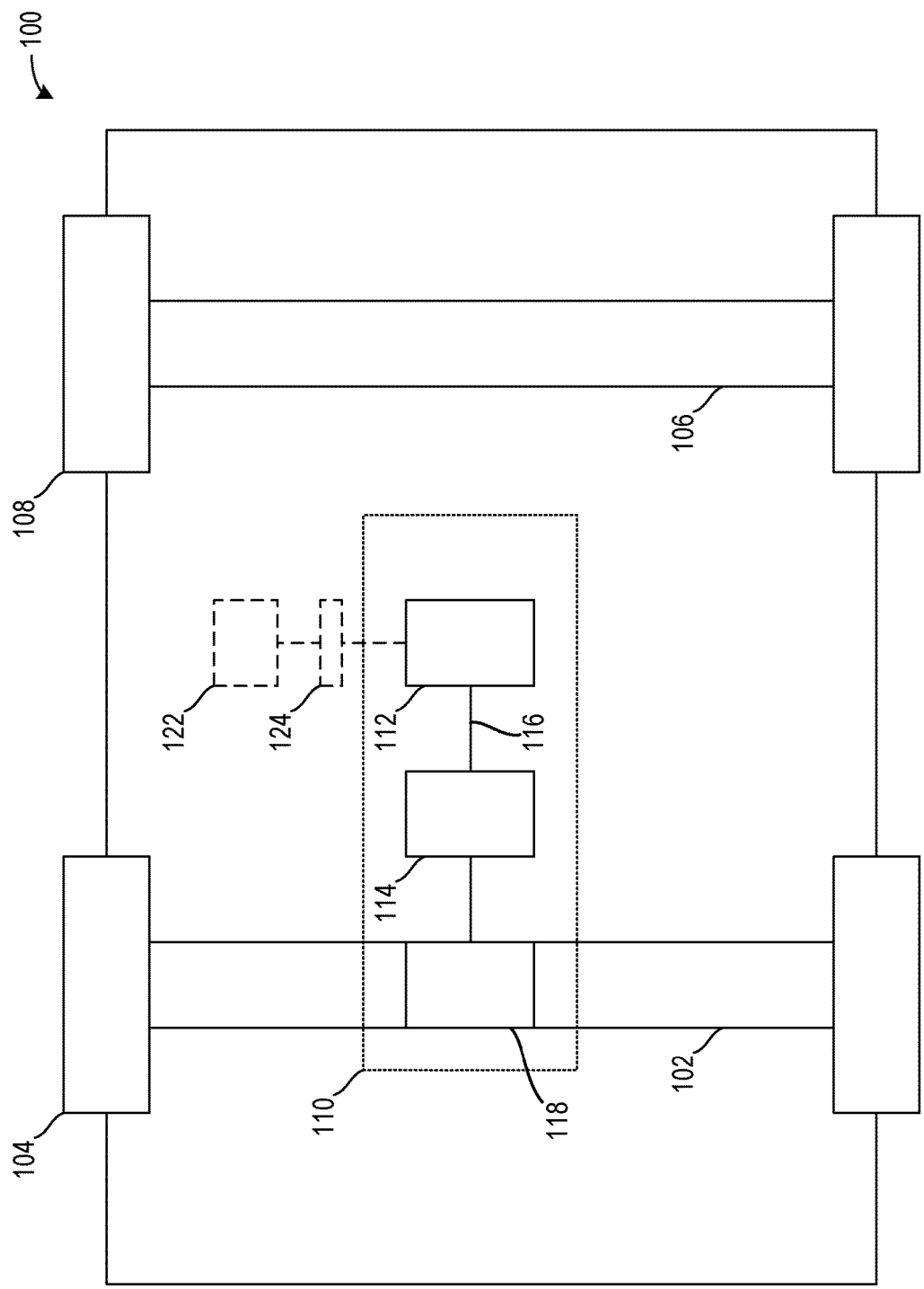
FIG. 1 is an example of a vehicle, according to an embodiment of the present disclosure.
Figure 2B:
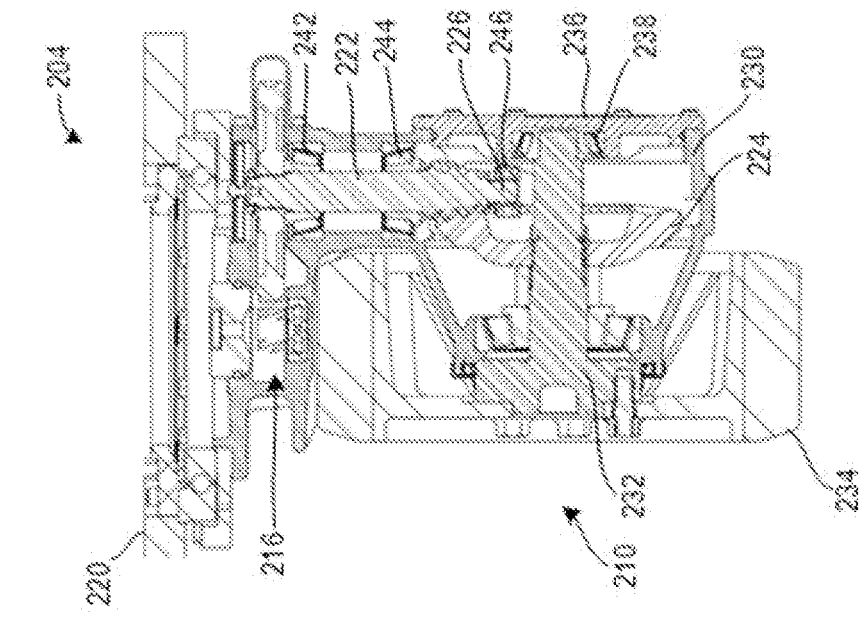
FIG. 2B is a cross-sectional view of the MDU along a center line of a hypoid pinion, according to an embodiment of the present disclosure.
Figure 2A:
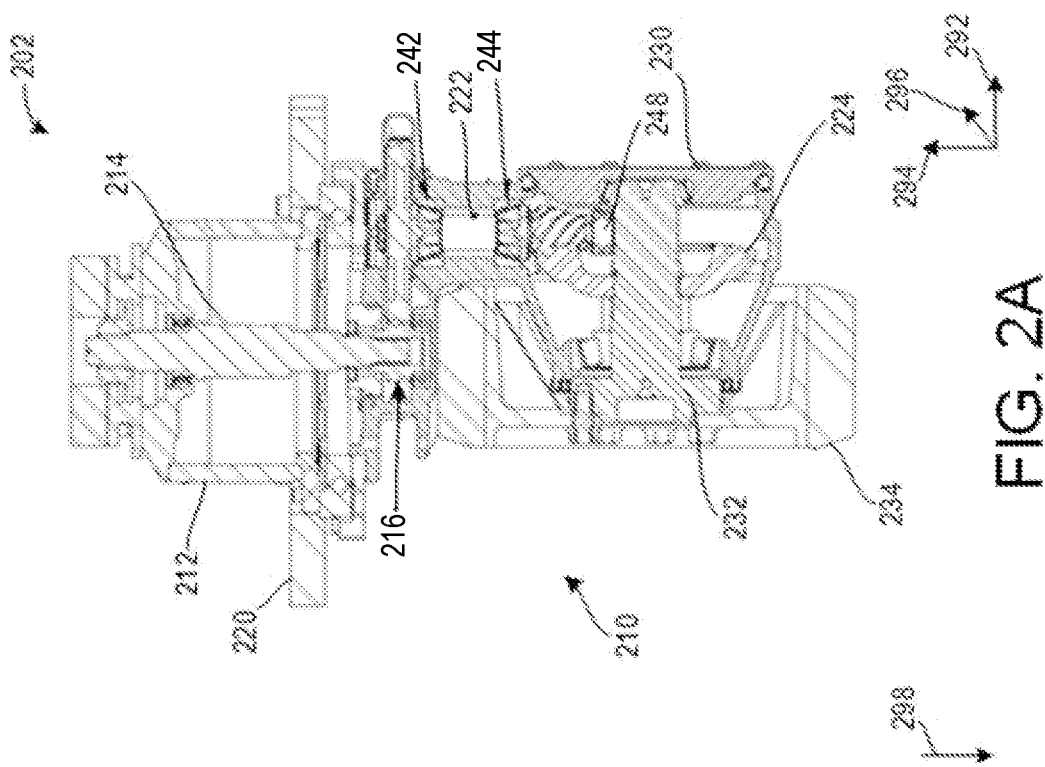
FIG. 2A is a cross-sectional view of the MDU along a center line of an output shaft, according to an embodiment of the present disclosure.
Figures 3A, 3B:
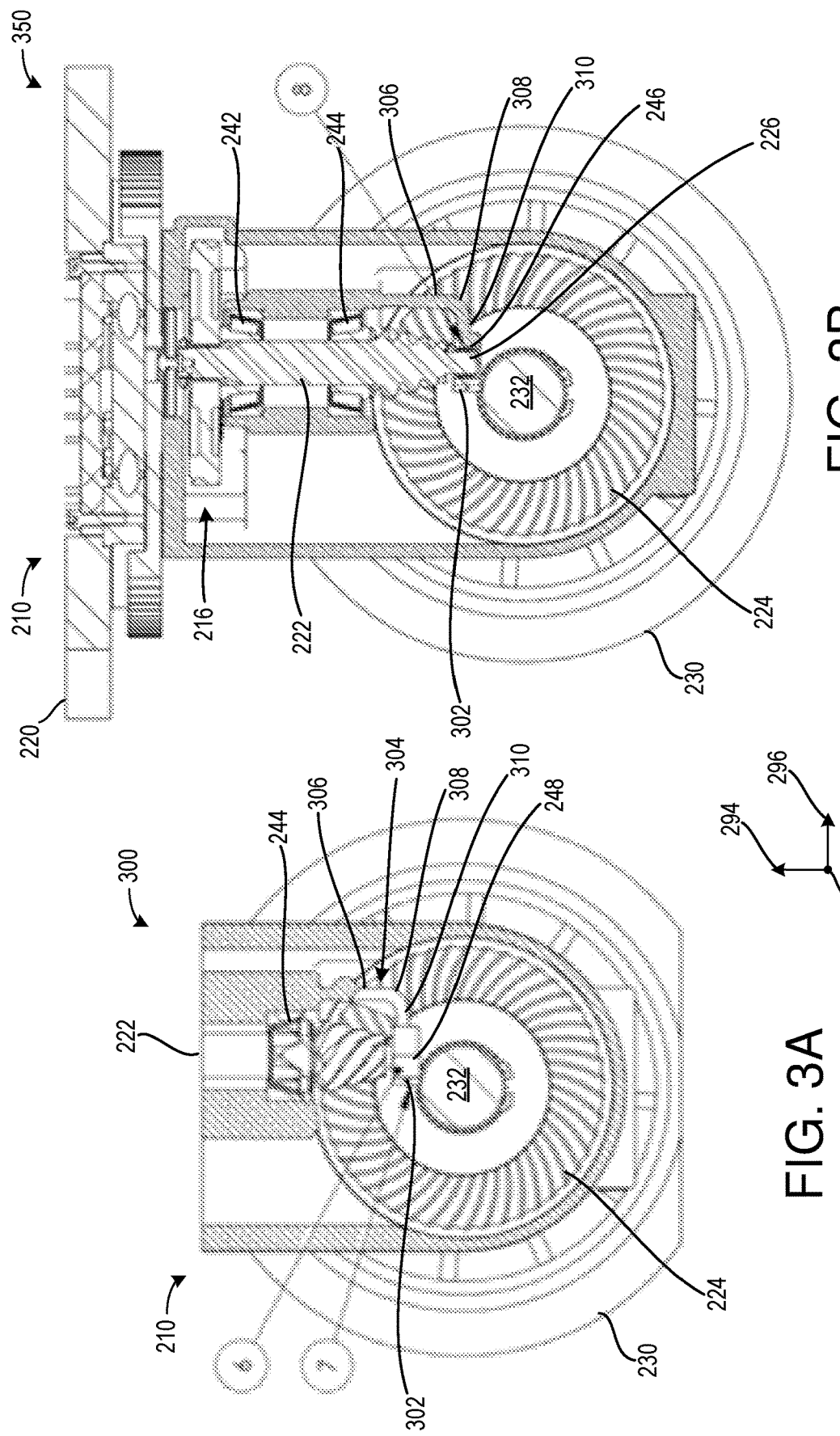
FIG. 3A is a view of the hypoid pinion parallel to an axis of rotation of the output shaft, according to an embodiment of the present disclosure.
FIG. 3B is a cross-sectional view along the center line of the hypoid pinion further illustrating a bearing, according to an embodiment of the present disclosure.
Figure 4:
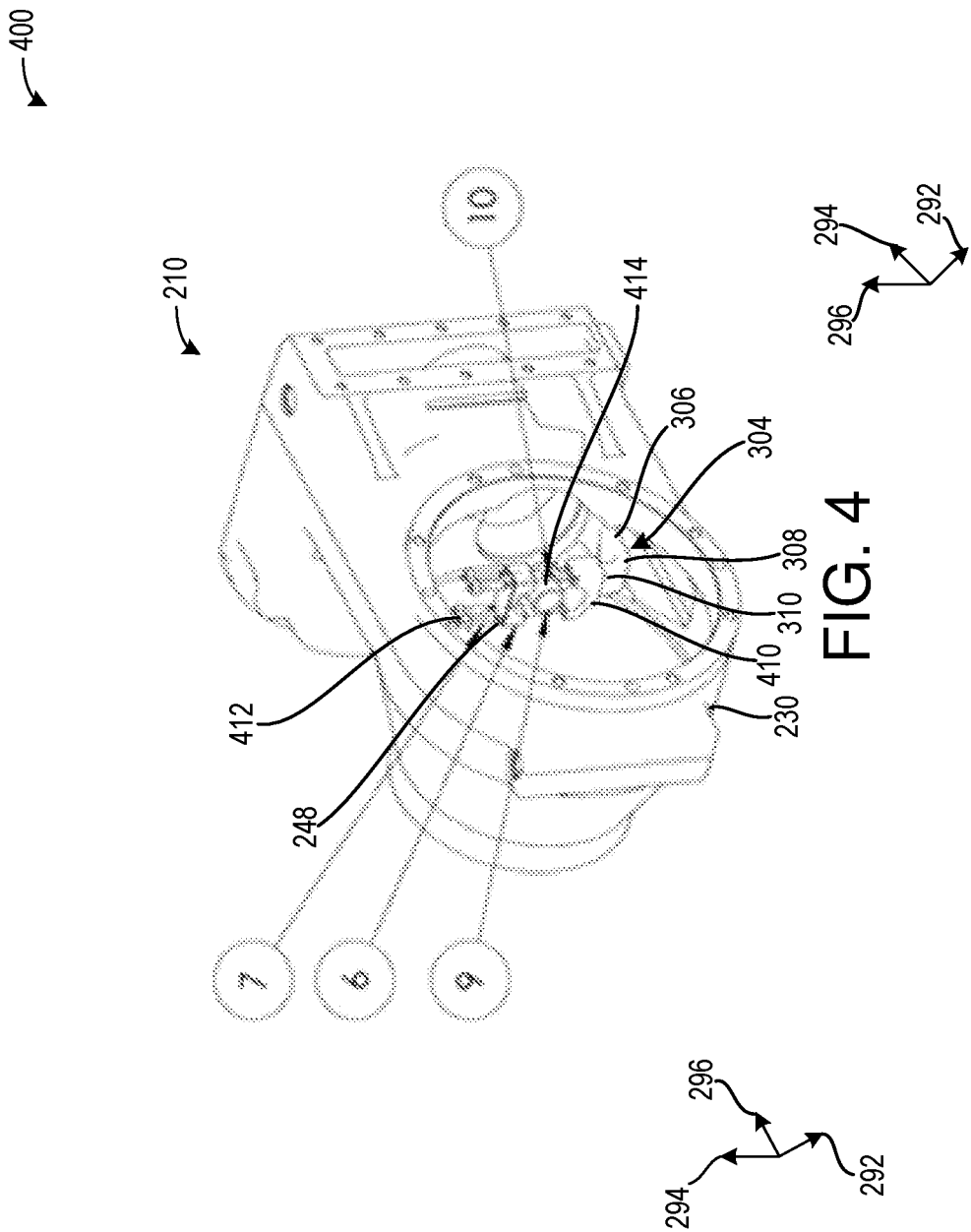
FIG. 4 is an exploded view of a housing projection and a cap for supporting the hypoid pinion, according to an embodiment of the present disclosure.
Figure 6:
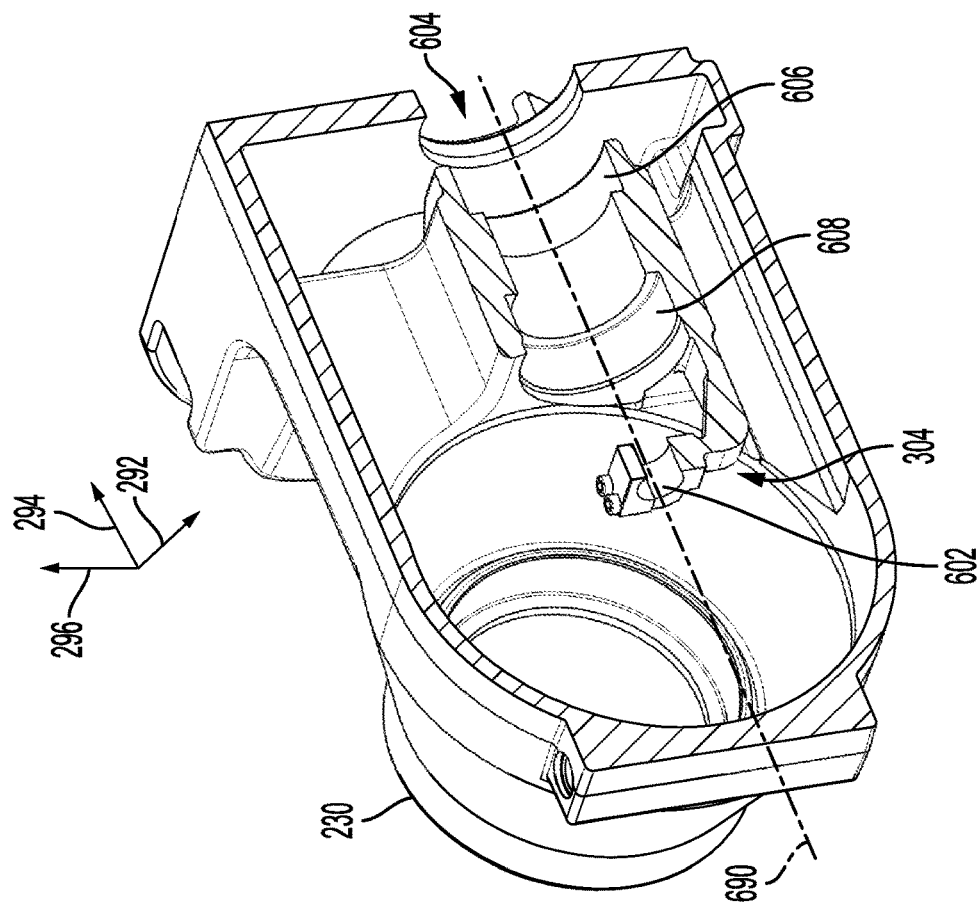
FIG. 6 is a view of the housing projection and a bore of the housing for supporting the hypoid pinion, according to an embodiment of the present disclosure.
Figure 5:
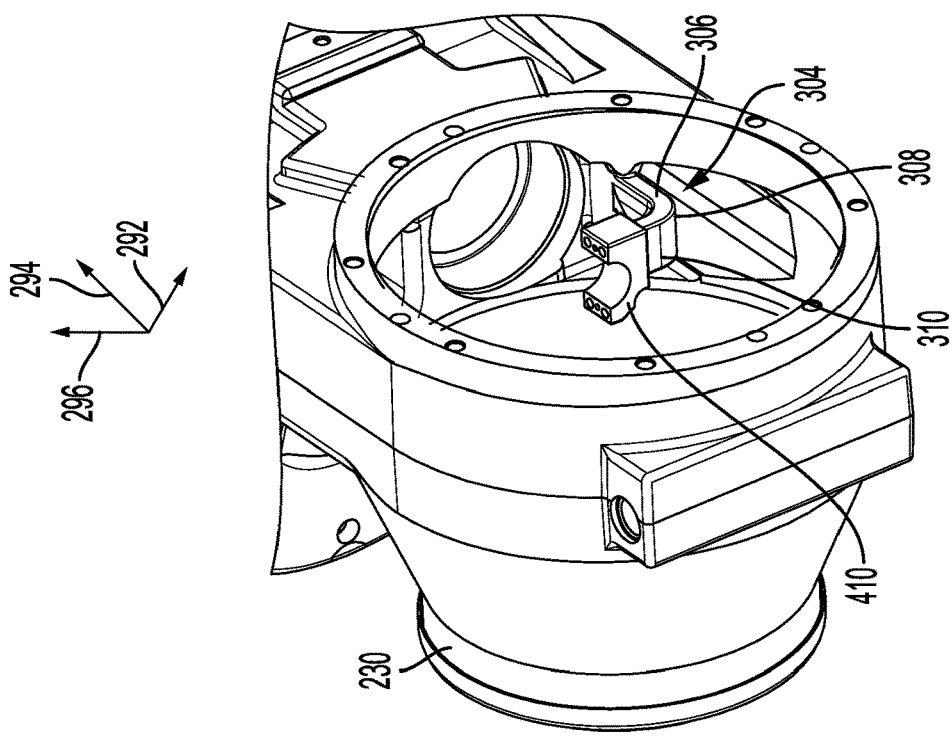
FIG. 5 is a view of the housing projection through an opening of the housing of the MDU, according to an embodiment of the present disclosure.
Figure 10B:
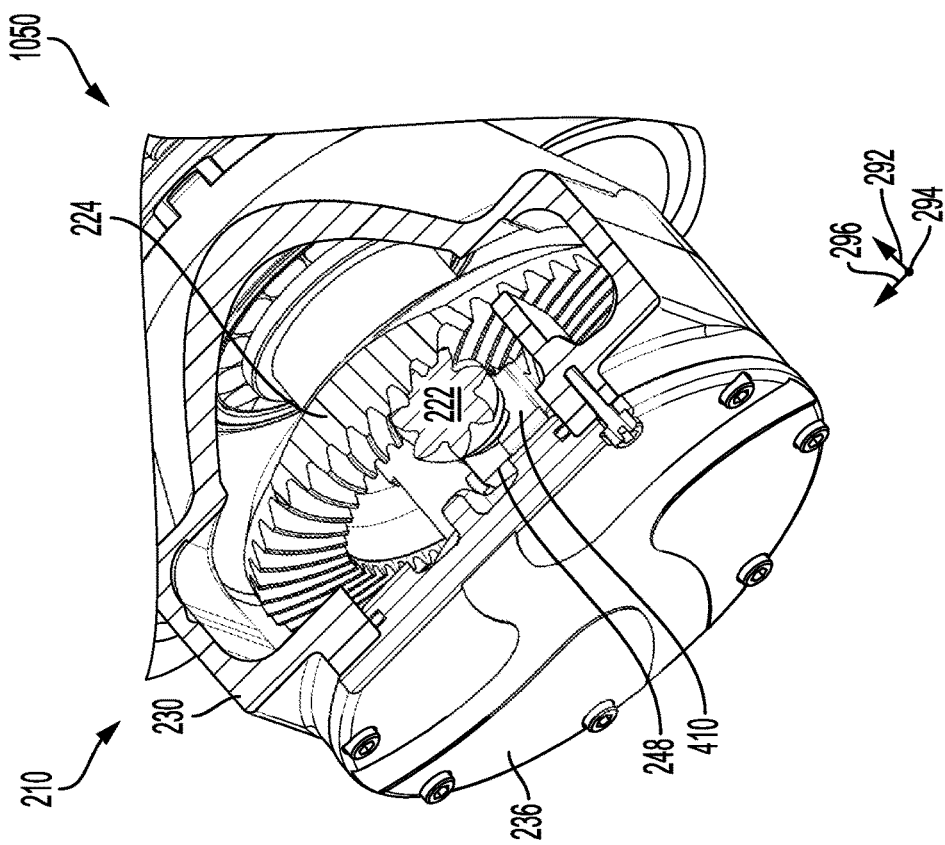
FIGS. 10A and 10B are detailed internal views of the MDU, according to an embodiment of the present disclosure.
Figure 10A:
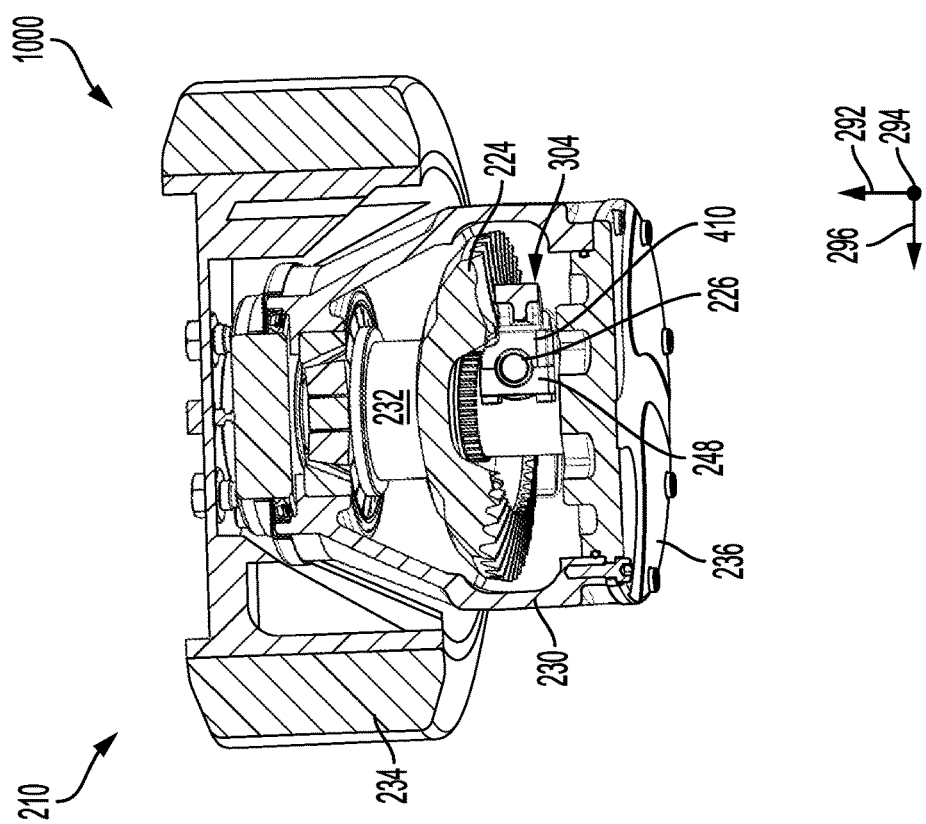
Figure 11A:
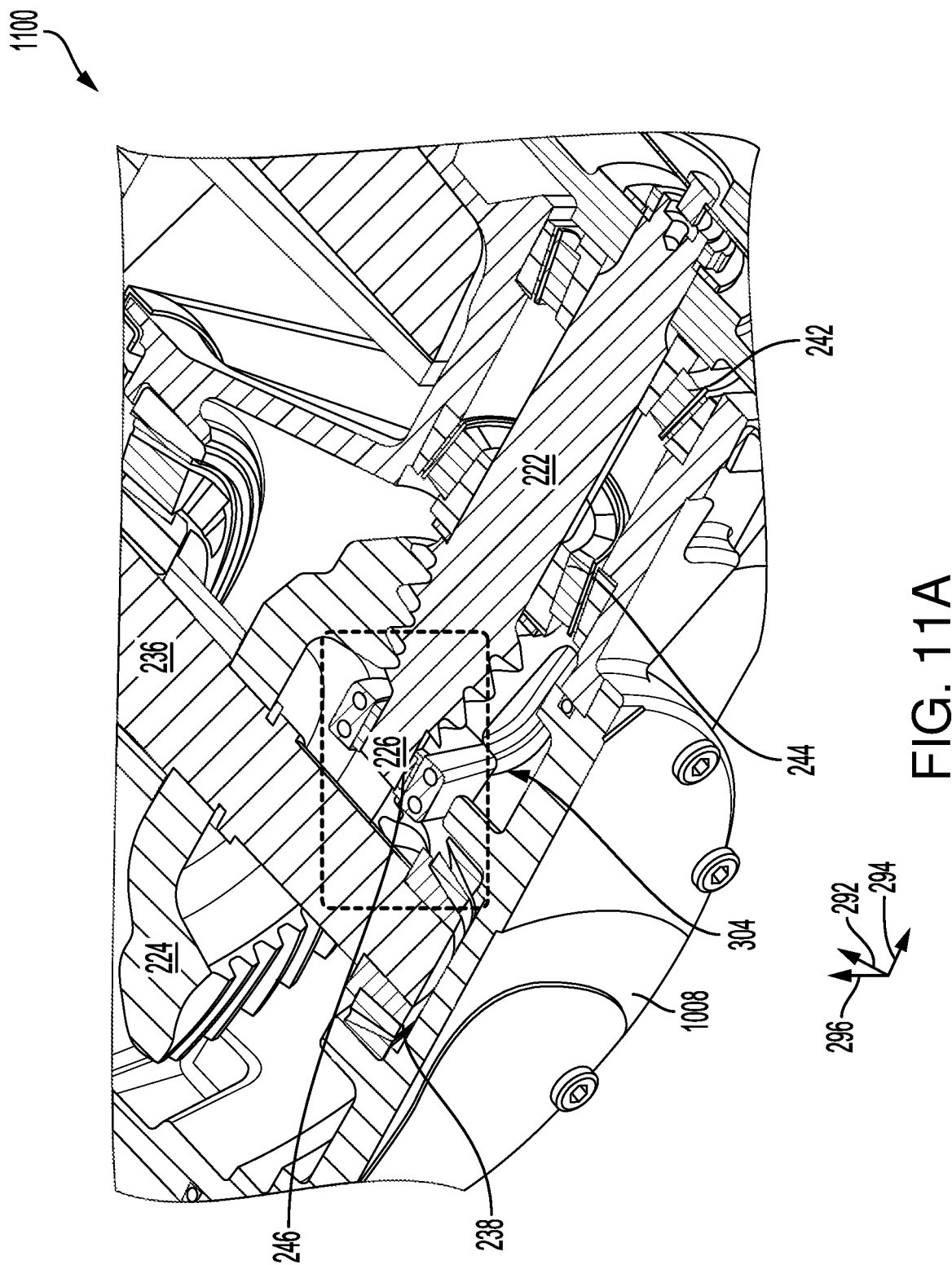
FIGS. 11A, 11B, and 11C illustrate a bearing arranged in the housing projection.
Figure 11C:
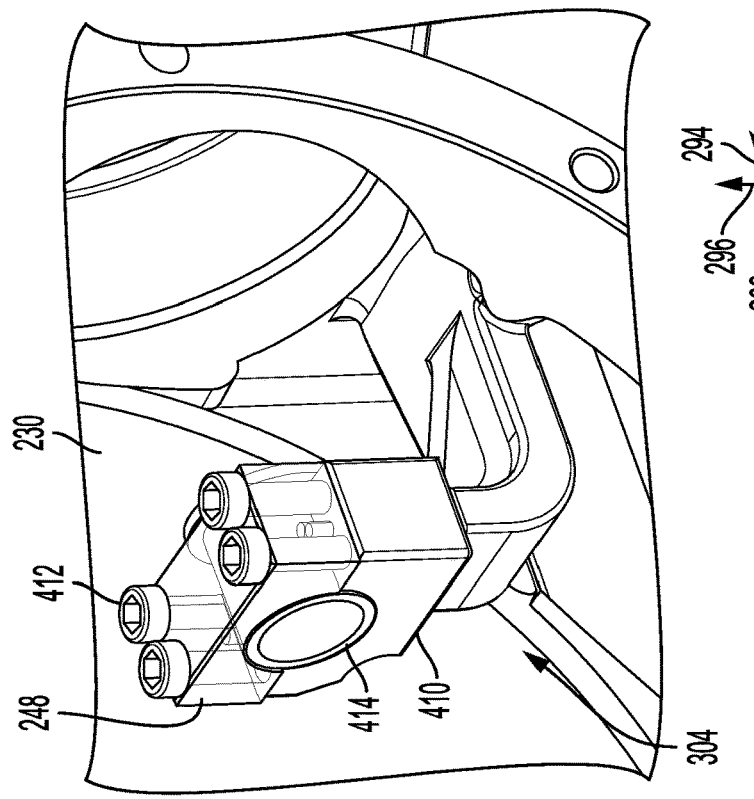
Figure 11B:
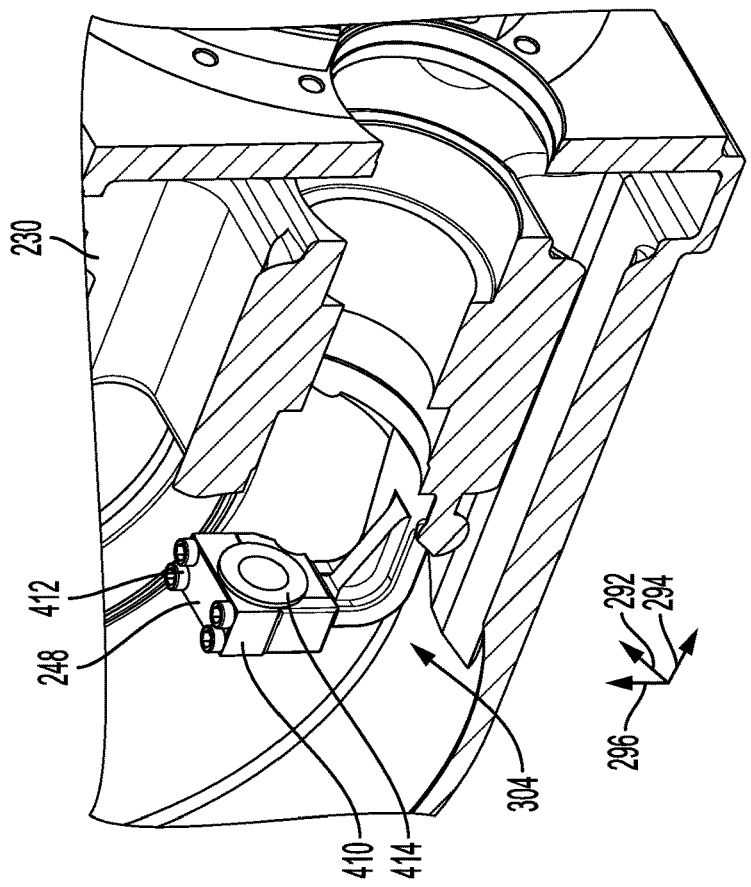

The following description relates to a drive unit of an off-highway vehicle. FIG. 1 is an example of a vehicle. FIG. 2A is a cross-sectional view of the MDU along a center line of an output shaft. FIG. 2B is a cross-sectional view of the MDU along a center line of a hypoid pinion. FIG. 3A is a view of the hypoid pinion. FIG. 3B is a cross-sectional view along the center line of the hypoid pinion further illustrating a bearing, according to an embodiment of the present disclosure. FIG. 4 is a view of a bearing support. FIG. 5 is a view of a housing with an integral casting projection coupled to the bearing support. FIG. 6 is a view of the bearing support with a bore for supporting the pinion. FIGS. 7A and 7B are views of a cap for the support. FIGS. 8 and 9 are views of a notch machined into the support for providing additional clearance for a gear. FIGS. 10A and 10B are detailed internal views of the MDU. FIGS. 11A, 11B, and 11C are different embodiments of bearings arranged in the support, according to an embodiment of the present disclosure.

FIGS. 1-11C show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred to as such, in one example. It will be appreciated that one or more components referred to as being "substantially similar and/or identical" differ from one another according to manufacturing tolerances (e.g., within 1-5% deviation). As used herein, the term "approximately" is construed to mean plus or minus five percent of the range unless otherwise specified. FIGS. 2-11C are shown approximately to scale, however, other dimensions may be used if desired.

Turning now to FIG. 1, an off-highway vehicle 100 is shown. The off-highway vehicle 100 includes a powertrain 110. The powertrain 110 includes a prime mover 112 as a power source. The prime mover 112 is coupled to a transmission 114 via a drive shaft 116. The drive shaft 116 transfers power from the transmission 114 to a differential 118 arranged on a drive axle 102. The differential 118 may control power output to halves of the drive axle 102, each half coupled to one wheel of a pair of first wheels 104. In one example, the differential 118 is a master drive unit (MDU).

In one example, the prime mover 112 is an engine. In another example, additionally or alternatively, the prime mover 112 is an electric machine. The electric machine may be coupled to an inverter 124, the inverter 124 coupled to a battery 122. In some examples, additionally or alternatively, the off-highway vehicle 100 may include an engine and an electric machine.

In one example, the drive axle 102 is a front axle 102, wherein the off-highway vehicle 100 further includes a rear axle 106 coupled to a pair of second wheels 108. The rear axle 106 may be arranged at a second extreme end of the off-highway vehicle opposite a first extreme end at which the front axle 102 is arranged.

Turning now to FIG. 2A, it shows a first cross-sectional view 202 of a master drive unit (MDU) 210 with a mounting plate 220. An axis system comprising three axes, namely a lateral axis 292, an axial axis 294 normal to the lateral axis 292, and a transverse axis 296 normal to the lateral axis 292 and the axial axis 294. Arrow 298 illustrates a direction of gravity. The direction of gravity faces a direction opposite the axial axis 294.

The mounting plate 220 may mount the MDU 210 to a vehicle frame. In one example, the mounting plate 220 may be physically coupled to a vehicle chassis, an axle, or other vehicle structure. The mounting plate 220 may be physically coupled via a plurality of fasteners, such as bolts, to the vehicle frame.

The first cross-sectional view is taken along the axial axis 294. In one example, the first cross-sectional view 202 is taken along a center line of the mounting plate 220 that is parallel to the axial axis 294 and within a plane along the lateral axis 292 and the axial axis 294. The MDU 210 may include a drive motor 212 comprising a shaft 214. The drive motor 212 and the shaft 214 may be arranged on a first side of the mounting plate 220, wherein the shaft 214 may extend from the first side, through an opening of the mounting plate 220, and to a second side of the mounting plate 220, opposite the first side, where a first stage reduction set 216 is arranged.

A hypoid pinion 222 may extend from the first stage reduction set 216 to a hypoid gear 224. The hypoid gear 224 may rotate an output axle 232 coupled to a wheel 234. Power may transfer from the drive motor 212, through the shaft 214 to the first stage reduction set 216, through the hypoid pinion 222 to the hypoid gear 224, and to the wheel 234 via the output axle 232. In one example, the hypoid gear 224 adjusts a direction of power by 90 degrees. Specifically, power flows in a direction parallel to the axial axis 294 toward the hypoid gear 224, wherein the hypoid gear 224 alters the direction of power to flow parallel to the lateral axis 292 toward the wheel 234.

A housing 230 may be arranged on the second side of the mounting plate 220. The housing 230 may house each of the first stage reduction set 216, the hypoid pinion 222, the hypoid gear 224, and a portion of the axle 232.

The hypoid pinion 222 may be supported by a plurality of bearings. The plurality of bearings may include a first bearing 242, a second bearing 244, and a third bearing 246 as shown in FIG. 2B. In some examples, each of the first, second, and third bearings may be different. In one example, the first bearing 242 and the second bearing 244 may be identical to one another and different than the third bearing 246. In the example of FIGS. 2A and 2B, the first bearing 242 is a taper roller bearing and the second bearing 244 is a taper roller bearing. The third bearing 246 may be a needle roller bearing.

FIG. 2B shows a cross-sectional view 204 along a center line of the hypoid pinion 222 within a plane along the lateral axis 292 and the axial axis 294. An interior of the plurality of bearings is shown. Additionally, a cap 248, shown in FIG. 2A, is omitted in the cross-sectional view 204, thereby exposing the third bearing 246. As illustrated, an end 226 of the hypoid pinion 222 is supported by the third bearing 246. In one example, the end 226 is supported by the third bearing 246 in an airspace of the housing 230 spaced away from interior surfaces of the housing 230. That is to say, the end 226 of the hypoid pinion 222 may be free floating in the housing 230 if the third bearing 246 and a housing projection for holding the third bearing 246 is omitted. The airspace of the housing 230 corresponds to a volume of the housing 230 interior to and spaced away from surfaces of the housing 230.

A cover 236 may be coupled to the housing 230 and configured to seal an opening of the housing 230 and retain a fourth bearing 238 for supporting the output shaft 232. In one example, the fourth bearing 238 supports an end of the output shaft 232 opposite an end coupled to the wheel 234.

Turning now to FIGS. 3A and 3B, they show views 300 and 350, respectively, of the hypoid pinion 222 in a direction parallel to the lateral axis 292. View 350 illustrates a cross-sectional view taken along the center line of the hypoid pinion 222 parallel to a plane within the axial and transverse axes.

In view 300 of FIG. 3A, the cap 248 is retained to a housing projection 304 via a fastener 302. In one example, the fastener 302 is a bolt. Additionally or alternatively, in some embodiments, the cap 248 may be welded or physically coupled to the housing projection 304 via another element.

The housing projection 304 may include a J-shape. More specifically, the housing projection 304 may include a first linear portion 306, a bend 308, and a second linear portion 310. The second linear portion 310 may be normal to the first linear portion 306. In one example, the first linear portion 306 is parallel to the axial axis 294 and the second linear portion 310 is parallel to the transverse axis 296. The housing projection 304 is described in greater detail below.

Turning to FIG. 4, it shows an embodiment 400 of an exploded view of the cap 248 separated from the housing projection 304. As illustrated, the housing projection 304 further includes a support end 410 extending from the second linear portion 310. The cap 248 may physically couple to the support end 410 via a plurality of fasteners 412.

In one example, the cap 248 and the support end 410 may retain a bushing 414. The bushing 414 may receive and support a portion of the hypoid pinion 222 in combination with the first bearing and the second bearing (e.g., first bearing 242 and second bearing 244 of FIG. 2B). The bushing 414 may be a non-limiting example of the third bearing 246 of FIG. 2B.

FIGS. 5, 6, 7A, and 7B illustrate further views of the cap 248 and the support end 410 of the housing projection 304. FIGS. 5-7B are described in tandem herein. As illustrated, the cap 248 and the support end 410 may include corresponding through holes configured to receive the plurality of fasteners 412. In one example, the support end 410 includes a plurality of through-holes 702 and the cap 248 includes a plurality of through-holes 704. One or more alignment features 710 may be configured to align the plurality of through-holes 702 and 704. In one example, the alignment features 710 are inserted into first alignment openings 712 of the support end 410. The cap 248 may be pressed onto the support end 410, wherein the alignment features 710 may insert into second alignment openings 714 of the cap 248. As such, the plurality of through-holes 702 and 704 may be aligned and the plurality of fasteners 412 may be inserted therethrough to physically couple the cap 248 to the support end 410.

The cap 248 and the support end 410 shape an opening 602 that is centered about an axis 690. A bore 604, through which the hypoid pinion (e.g., hypoid pinion 222 of FIG. A) is arranged, may also be centered about the axis 690. In one example, the bore 604 and the opening 602 are machined during a single step of a manufacturing process of the housing 230 such that an alignment of the bore 604 and the opening 602 is maintained. Thus, in one example, a manufacturing method may include machining the housing projection 304, machining the plurality of through-holes 702 and the first alignment openings 712, machining the cap 248 along with the plurality of through-holes 704 and the second alignment openings 714 thereof, physically coupling the cap 248 to the support end 410, and machining the bore 604 and the opening 602 into the housing 230, the housing projection 304, and the cap 248.

In one example, the bore 604 may include one or more recesses including a first recess 606 and a second recess 608. The first recess 606 may be configured to receive the first bearing (e.g., first bearing 242 of FIG. 2A) and the second recess 608 may be configured to receive the second bearing (e.g., second bearing 244 of FIG. 2A).

Turning now to FIGS. 8 and 9, they show views 800 and 900, respectively, of the housing projection 304. View 800 shows the housing projection 304 with the cap 248 physically coupled thereto. View 900 shows the housing projection 304 without the cap 248. FIGS. 8 and 9 are described in tandem herein.

The housing projection 304 may further include a brace 810. The brace 810 may include a triangular shape. In one example, a width of the brace 810, measured along the lateral axis 292, may be less than a width of each of the first linear portion 306, the bend 308, and the second linear portion 310. The brace 810 may extend from and be in face-sharing contact with the first linear portion 306, the bend 308, and the second linear portion 310. The brace 810 may physically couple to an underside of the support end 410.

As illustrated, the first linear portion 306 extends from an extreme end of the housing 230 adjacent to the second recess 608 of the bore 604. A housing projection support 802 may be physically coupled to the first linear portion 306 and the housing 230. The first linear portion 306 may be suspended in air (e.g., cantilevered) as it extends toward the bend 308 from the housing projection support 802. In one example, the housing projection support 802 comprises a cylindrical shape.

The bend 308 may turn such that the housing projection 304 begins to extend along the transverse axis 296 via the second linear portion 310, normal to the lateral axis 292 along which the first linear portion 306 extends.

The support end 410 may include a U-shape including a body 820, a first arm 822, and a second arm 824. The body 820 may be coupled to the first arm 822 at a first extreme end and to the second arm 824 at a second extreme end opposite the first extreme end. A thickness, measured along the axial axis 294, and a width of the body 820, the first arm 822, and the second arm 824 are greater than a thickness and a width of each of the first linear portion 306, the bend 308, and the second linear portion 310.

The cap 248 may include a shape similar to the shape of the support end 410. In one example, the cap 248 is identical to the support end 410. Additionally or alternatively, dimensions of the cap 248 may be adjusted relative to the support end 410 while a shape of the cap 248 may be similar to the support end 410. As such, the cap 248 may include a U-shape including a body from which arms extend.

The body 820 may include different corners at the first and second extreme ends. For example, a first corner 826 may be a 90 degree corner. A second corner 828 may be a machined corner comprising a curvature. In one example, the second corner 828 is not a 90 degree corner. The second corner 828 may be recessed such that a profile of the second corner 828 is reduced, which may provide additional space for a gear (e.g., hypoid gear 224 of FIG. 2B) or another component of the MDU. In one example, the second corner 828 faces a first housing opening 902, wherein the first housing opening 902 may be adjacent to a wheel (e.g., wheel 234 of FIG. 2B) and opposite a second housing opening 904. In one example, the second corner 828 is shaped with a notch.

The plurality of fasteners 710 may extend through arms of the cap 248 and the support end 410. As illustrated in FIG. 8, heads of the plurality of fasteners 710 may protrude from the cap 248. In some examples, additionally or alternatively, the cap 248 may include recesses such that the heads of the plurality of fasteners 710 are flush with a top of the body of the cap 248.

FIGS. 10A and 10B show additional views 1000 and 1050, respectively, of the hypoid gear 224 and the hypoid pinion 222. View 1000 illustrates the housing projection 304 supporting the end 226 of the hypoid pinion 222 as it is meshed with the hypoid gear 224. View 1000 further illustrates the clearance provided by the second corner 828 for the hypoid gear 224. View 1050 illustrates a mid-section of the hypoid pinion 222 in meshed engagement with the hypoid gear 224 while it is supported by the housing projection 304.

The housing projection 304 is adjacent to the cover 236 that seals the second housing opening (e.g., second housing opening 904 of FIG. 9). In one example, the housing projection 304 is misaligned with a geometric center of the cover 236. Additionally or alternatively, the housing projection 304 may be arranged in a volume of the housing 230 that is between the geometric center and a circumference of the cover 236.

View 1050 illustrates a cross-section of the hypoid pinion 222 taken between the second bearing (e.g., second bearing 244 of FIG. 2A) and the support end 410. The view 1050 illustrates a portion of the hypoid pinion 222 comprising teeth in meshed engagement with teeth of the hypoid gear 224.

FIG. 11A shows an embodiment 1100 of the needle bearing 246 arranged in the housing projection 304 and supporting the end 226 of the hypoid pinion 222. As illustrated, a toothed portion of the hypoid pinion 222 that engages with the hypoid gear 224 may be between the second bearing 244 and the needle bearing 246.

The output shaft 232, on which the hypoid gear 224 is arranged, may be coupled to the wheel (e.g., wheel 234 of FIG. 2B) and supported by the fourth bearing 238. The fourth bearing 238 may be arranged on surfaces of the cover 236. As illustrated, the toothed portion of the hypoid pinion 222 is between the second bearing 244 and the third bearing 246.

FIGS. 11B and 11C show the housing projection 304 with the bushing 414 arranged therein. As shown, the bushing 414 is inserted into the opening of the housing projection 304 and the cap 248 (e.g., opening 602 of FIG. 6), wherein the bushing 414 may be retained in place via a compressive force between the cap 248 and the support end 410 generated via the plurality of fasteners 710. In one example, the bushing 414 is a sleeve bearing.

In one example, a method of manufacturing the MDU may include machining a housing with a housing protrusion extending into a volume spaced away from surfaces of the housing. The method of manufacturing may further include machining a bore through the housing and the housing protrusion. The method of manufacturing may further include arranging a bearing on the housing protrusion and retaining the bearing thereto via a cap. A pinion is arranged in the bore, wherein an end of the pinion is supported by the bearing.

The disclosure provides support for a system including a master drive unit (MDU) comprising a hypoid pinion coupled to a hypoid gear, wherein the hypoid pinion comprises an end supported by a bearing arranged in a housing projection of a housing of the MDU. A first example of the system further includes where the bearing is physically coupled to the housing projection via a compressive force between a support end of the housing projection and a cap. A second example of the system, optionally including the first example, further includes where a plurality of fasteners fixedly couples the cap to the support end, and wherein the cap and the support end are identical in shape. A third example of the system, optionally including one or more of the previous examples, further includes where the housing projection comprises a first linear portion coupled to a bend and a second linear portion coupled to the bend. A fourth example of the system, optionally including one or more of the previous examples, further includes where the second linear portion is normal to the first linear portion. A fifth example of the system, optionally including one or more of the previous examples, further includes where a support end extends from the second linear portion. A sixth example of the system, optionally including one or more of the previous examples, further includes where a brace extends from the first linear portion, the bend, and the second linear portion. A seventh example of the system, optionally including one or more of the previous examples, further includes where the brace is triangular.

The disclosure provides additional support for a master drive unit (MDU) of an off-highway vehicle including a housing containing a gear reduction set, a hypoid pinion, and a hypoid gear arranged on an output shaft coupled to a wheel, wherein the housing comprises a housing projection having a support end to which a cap is coupled, and a bearing arranged between the cap and the support end, wherein the bearing supports an end of the hypoid pinion proximal to the output shaft. A first example of the MDU further includes where the support end and the cap comprise a U-shape including a body from which a first arm and a second arm extend. A second example of the MDU, optionally including the first example, further includes where the bearing is a needle bearing. A third example of the MDU, optionally including one or more of the previous examples, further includes where the bearing is a sleeve bearing. A fourth example of the MDU, optionally including one or more of the previous examples, further includes where the housing projection comprises a J-shape including a first linear portion, a bend, and a second linear portion normal to the first linear portion. A fifth example of the MDU, optionally including one or more of the previous examples, further includes where the bend is between the first linear portion and the second linear portion, and wherein a triangular brace is in face-sharing contact with each of the first linear portion, the bend, and the second linear portion. A sixth example of the MDU, optionally including one or more of the previous examples, further includes where a corner of the support end is curved and spaced away from the hypoid gear.

The disclosure provides further support for a housing for a master drive unit (MDU) including a housing projection comprising a first linear portion supported by a housing support, a bend extending from the first linear portion into a space between surfaces of the housing, and a second linear portion extending from the bend and coupled to a support end, wherein a bearing is arranged between the support end and a cap and receives an extreme end of a pinion. A first example of the housing further includes where the pinion is in meshed engagement with a hypoid gear between the bearing and a bore of the housing. A second example of the housing, optionally including the first example, further includes where the support end, the second linear portion, the bend, and a portion of the first linear portion away from the housing support extend into an airspace of the housing and do not touch interior surfaces of the housing. A third example of the housing, optionally including one or more of the previous examples, further includes where the pinion is a hypoid pinion supported by a plurality of bearings arranged in a bore of the housing. A fourth example of the housing, optionally including one or more of the previous examples, further includes where an axis that extends through a geometric center of the bore extends through a geometric center of an opening shaped by the cap and the support end.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A housing for a master drive unit (MDU), comprising:
a housing projection comprising a first linear portion supported by a housing support, a bend extending from the first linear portion into a space between surfaces of the housing, and a second linear portion extending from the bend and coupled to a support end;

wherein the second linear portion is normal to the first linear portion;

wherein a triangular brace is in face-sharing contact with each of the first linear portion, the bend, and the second linear portion;

wherein a bearing is arranged between the support end and a cap and receives an extreme end of a hypoid pinion supported by a plurality of bearings arranged in a bore of the housing, the plurality of bearings including the bearing and at least two further bearings;

wherein the support end and the cap each comprise a U-shape including a body from which a first arm and a second arm extend, the body coupled to the first arm at a first extreme end and coupled to the second arm at a second extreme end opposite the first extreme end;

wherein the body of the cap includes a first 90-degree corner at the first extreme end of the cap and a second 90-degree corner at the second extreme end of the cap; and wherein the body of the support end includes a third 90-degree corner at the first extreme end of the support end and a machined corner comprising a curvature at the second extreme end of the support end.

2. The housing of claim 1, wherein the pinion is in meshed engagement with a hypoid gear between the bearing and a bore of the housing.

3. The housing of claim 1, wherein the support end, the second linear portion, the bend, and a portion of the first linear portion away from the housing support extend into an airspace of the housing and do not touch interior surfaces of the housing.

4. The housing of claim 1, wherein an axis that extends through a geometric center of the bore extends through a geometric center of an opening shaped by the cap and the support end.

5. The housing of claim 1, wherein the machined corner is shaped with a notch and faces a first housing opening adjacent to a wheel and opposite a second housing opening.

* * * * *